US005230938A

United States Patent [19]

Hess et al.

[11] Patent Number: 5,230,938

[45] Date of Patent: Jul. 27, 1993

[54] PROTECTED FOLD AND SEAL LABEL FOR DEMAND PRINTING

[75] Inventors: Robert C. Hess, Erie, Pa.; Patricia J. Bulka, Merrimack, N.H.

[73] Assignee: Moore Business Forms, Inc., Grand Island, N.Y.

[21] Appl. No.: 666,924

[22] Filed: Mar. 11, 1991

[51] Int. Cl.[5] .......................... B32B 3/10; B32B 7/06; B32B 7/12

[52] U.S. Cl. ........................................ 428/42; 428/41; 428/43; 428/137; 428/138; 283/79; 283/81

[58] Field of Search ..................... 428/41, 42, 43, 137, 428/138, 77; 283/79, 81

[56] References Cited

U.S. PATENT DOCUMENTS

| | | | |
|---|---|---|---|
| 2,671,678 | 3/1954 | Walsh | 282/27 |
| 2,979,840 | 4/1961 | Eastman | 40/2 |
| 3,148,468 | 9/1964 | Vander Weel et al. | 40/2 |
| 3,252,234 | 5/1966 | Goodman | 40/2 |
| 4,248,919 | 2/1981 | Davis | 428/40 |
| 4,446,183 | 5/1984 | Savagian | 428/42 |
| 4,696,843 | 9/1987 | Schmidt | 428/41 |
| 4,951,970 | 8/1990 | Burt | 283/67 |
| 4,983,438 | 1/1927 | Jameson | 283/81 |

*Primary Examiner*—Alexander S. Thomas

*Attorney, Agent, or Firm*—Nixon & Vanderhye

[57] ABSTRACT

A label construction provides for labels applied to a surface that have long life even outdoors, or in conditions where there are dirt or chemicals. The construction includes a first ply of transparent protective material having first and second side sections and first and second faces. A first adhesive is disposed on the first ply first face, and a first release liner, having less affinity for the first adhesive than the transparent protective material, is disposed on the first adhesive covering the first side section of the first ply. A second release liner is disposed on the first adhesive covering the second side section of the first ply. A label ply is disposed over at least a portion of the second release liner on the opposite face from the transparent protective material, and a second adhesive is disposed between the second release liner and the label ply, having a greater affinity for the label ply than the second release liner. The construction is preferably in continuous form with tractor holes formed on the first and second release liners. The first release liner is removed, the protective material is folded over the label ply after printing of bar code information on it, and the second release liner is removed from the back of the label ply to expose the first adhesive, which is then applied to a surface.

10 Claims, 2 Drawing Sheets

PROTECTED FOLD AND SEAL LABEL FOR DEMAND PRINTING

BACKGROUND AND SUMMARY OF THE INVENTION

Labels are a type of business form that can be used in a wide variety of different applications. One particular application that is particularly useful is for the demand printing of bar codes or like indicia, and then application of those bar codes—once printed—to any desired surface, object, or the like. Such a system can be used for inventory control, equipment identification and maintenance, or a wide variety of other functions.

A problem associated with prior art label constructions used for demand printing of bar codes, or the like, however, is a relatively short label life in adverse environments. For example wherever such bar code labels are used in outdoor, shop, or like conditions—any environment in which there is likely to be chemicals, dirt, dust, and/or moisture—the bar code legibility can soon degrade, requiring replacement of the label.

According to the present invention a label construction, and method of production of labels, are provided which greatly enhance label life, in a simple manner. According to the present invention, a label construction is provided which has a protective material covering over the bar code or like printing on the label face. Yet despite the protective functionality of the construction according to the invention, the invention may be easily utilized for the demand printing of bar codes, being simple to manufacture and utilize, relatively inexpensive, and having a variety of other advantages associated therewith. The label construction is preferably provided in continuous form which greatly facilitates the printing operation and ultimate utilization of the labels.

According to one aspect of the present invention, a label construction is provided. The label construction comprises: A first ply of transparent protective material, having a first side section and a second side section, a first face, and a second face. A first adhesive disposed on the first ply first face. A first release liner, having less affinity for the first adhesive than the transparent protective material, disposed on the first adhesive, covering the first side section of the first ply. A second release liner, disposed on the first adhesive covering the second side section of the first ply, the second release liner and the transparent protective material both having affinity for the first adhesive. A label ply disposed over at least a portion of the second release liner on the opposite face thereof from the transparent protective material. And, a second adhesive disposed between the second release liner and the label ply and having greater affinity for the label ply than the second release liner.

As earlier indicated, the label construction is preferably in continuous form, with tractor holes formed in the first and second release liners, and with a plurality of spaced parallel perforation sets formed in each of the transparent material ply, label ply, and release liner to form a plurality of distinct label assemblies. A slit may be formed in the transparent material ply in the second section thereof, adjacent the first section, the slit substantially perpendicular to the perforation sets. The transparent material is preferably of Mylar, and a perforation may be formed in the transparent protective material ply between the first and second sections.

According to another aspect of the present invention, a method of forming a protected printed label is provided. The method comprises the steps of: (a) Printing indicia (preferably bar code) on the label ply. (b) Removing the first release liner from the transparent protective material ply, e.g. by folding it over and bending back. (c) Folding the transparent material ply first section over the printed indicia on the label ply, and adhesively fixing the transparent material ply first section onto the label ply. (d) Removing the second release liner and second section of transparent material ply from the label ply. And, (e) applying the adhesive of the label ply onto a surface, with the printed indicia and transparent material thereon facing away from the surface. The construction is in continuous form, with a plurality of individual labels formed in the label ply with perforations between the labels, and comprising the further step, between steps (a) and (b), of bursting the individual labels from the construction along the perforations, and removing the tractor margins opposite the section of the label with indicia thereon.

According to yet another aspect of the present invention a label is provided comprising: A paper ply having a top face with printing (e.g. bar code) thereon, and a bottom face with a first adhesive thereon (the first adhesive affixed to a surface). A transparent protective material ply (e.g. Mylar) disposed over the paper ply top face, and completely covering it. And, a second adhesive disposed between the paper ply top face and the protective material ply to prevent removal of the protective material ply.

It is the primary object of the present invention to provide a simple yet effective improved label construction and method. This and other objects of the invention will become clear from an inspection of the detailed description of invention and from the appended claims.

DETAILED DESCRIPTION OF THE DRAWINGS

Figure 1:
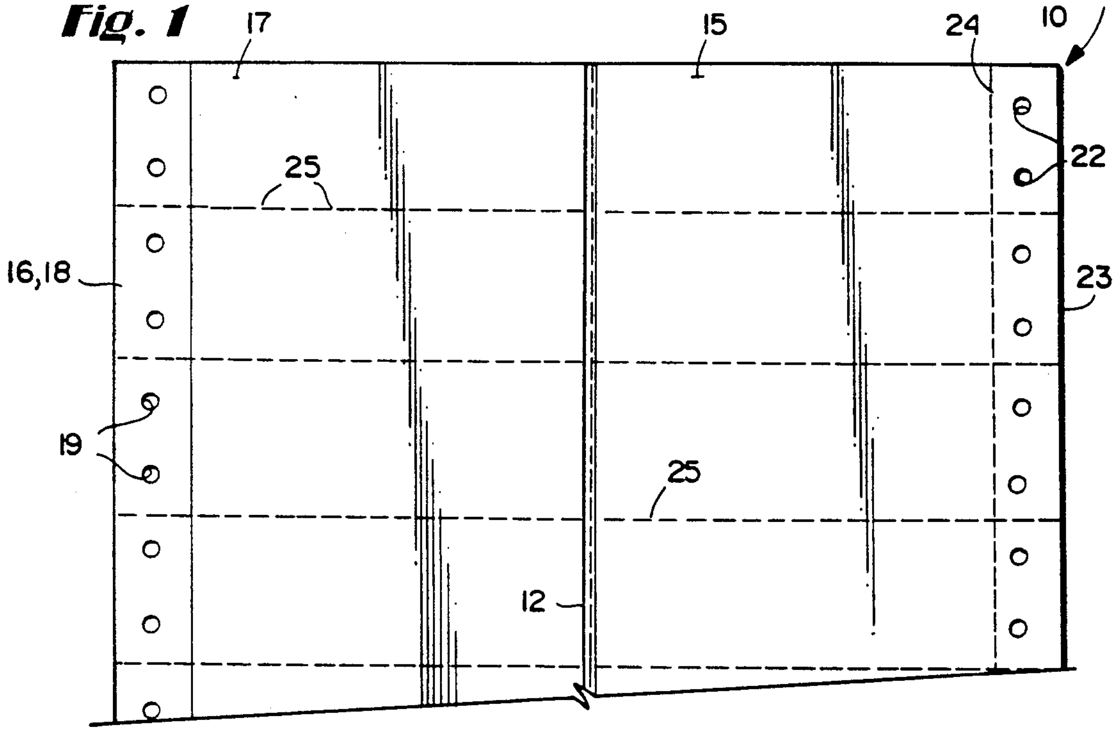
FIG. 1 is a top plan view of a label construction according to the present invention.
Figure 2:
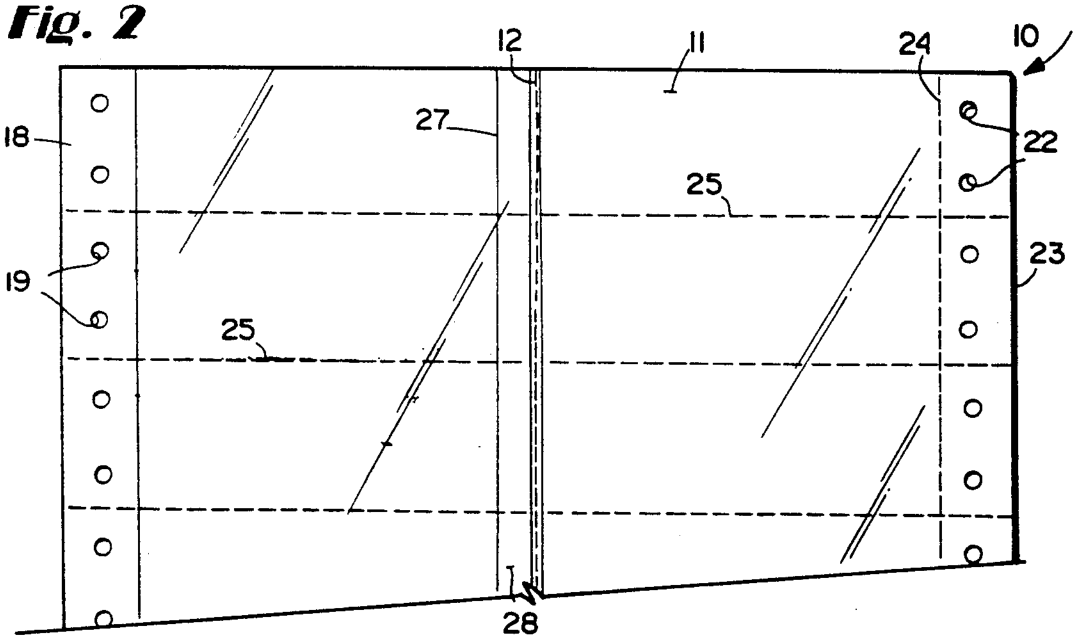
FIG. 2 is a bottom plan view of the construction of FIG. 1.
Figure 3:
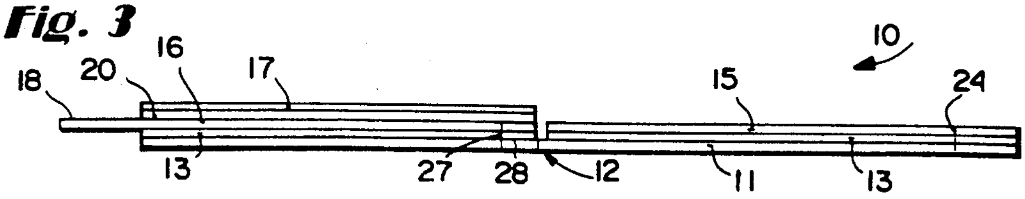
FIG. 3 is a schematic, end view of the construction OF FIGS. 1 and 2.

A continuous form of label construction according to the present invention is shown generally by reference numeral 10 in FIGS. 1 through 3. The construction 10 comprises a first ply 11 of transparent protective material, such as Mylar, the transparent material 11 comprising first and second side sections, separated by the center line 12 (which preferably comprises a perforation). The first section is on the right hand side of the perforation 12 viewed in FIGS. 1 through 3, and the second section on the left hand as viewed in those figures. The Mylar 11 also has a first face on which the first adhesive 13 is applied, and a second face, opposite that first face, no adhesive being applied on the second face. A first release liner 15, having less affinity for the first adhesive 13 than the material 11, is disposed on the first adhesive 13 covering the first side section of the first ply. A second release liner 16 is disposed on the first adhesive 13 covering the second side section of the first ply. The second release liner 16 face that is in contact with the first adhesive 13 has an affinity for the first adhesive 13 so that the first adhesive 13 essentially permanently attaches the second release liner 16 and the transparent material (11) second section together.

A label ply 17 is disposed over at least a portion of the second release liner 16 (preferably over the entire second release liner 16 except for a marginal portion 18 thereof that includes the tractor openings 19), and may be of any conventional label material, such as standard 50 EDP (50 pound electronic data processing paper) pressure sensitive material. A second adhesive 20 is disposed between the second release liner 16 and the label ply 17, and has a greater affinity for the label ply 17 than the second release liner 16.

As illustrated in FIGS. 1 through 3, the construction 10 preferably is in continuous form, having—in addition to the tractor openings 19 in the second release liner 16 at the left hand side of the form in FIGS. 1 through 3, tractor opening 22 disposed in the first release liner 15 (and Mylar ply 11) at the right hand edge 23 of the construction 10. Preferably, perforations 24 separate the tractor holes 22 from the rest of the first release liner 15 and first section of Mylar 11.

The construction 10 is preferably devised so that it is separated into a plurality of spaced parallel perforation sets (formed in each of the transparent material ply 11, label ply 17, and release liners 15, 16) to form a plurality of distinct label assemblies. See perforations 25 in FIGS. 1 and 2. In particular a label assembly formed thereby is illustrated generally by reference numeral 26 in FIG. 4, detached from the rest of the construction 10.

The construction 10 also comprises means defining a slit 27 in the transparent material ply 11 second section, adjacent the first section, the slit 27 being substantially perpendicular to the perforation sets 25. The slit 27 also extends through the second release liner 16, but not the label ply 17. It forms a tab section 28 of Mylar 11 and second release liner 16 between the perforation 12 and the slit 27, and a much larger section to the left thereof as seen in FIGS. 2 and 3.

In the utilization of the construction 10 to form a label, the entire construction 10 is fed through a printer, utilizing the tractor holes 19, 22 to drive the construction 10 through the printer. The printer prints indicia 30 (see FIG. 4) on the top face of the label ply 17. Preferably, the indicia 30 includes a bar code, as illustrated in FIG. 4.

Figure 4:
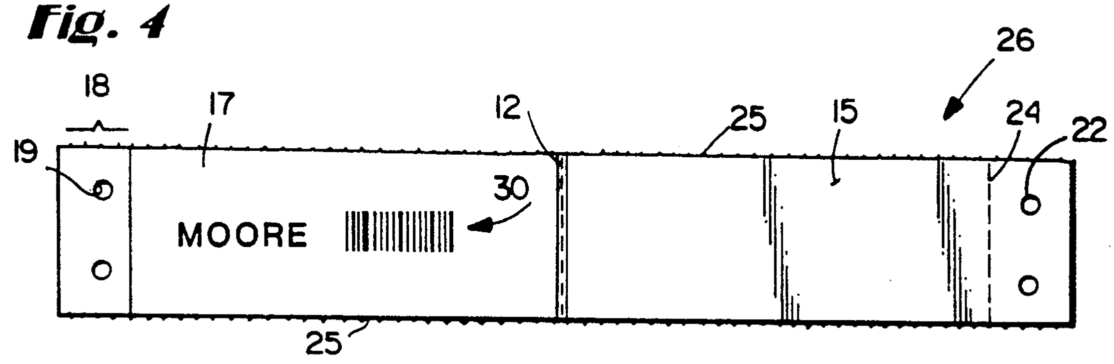
FIG. 4 is a top plan view of one label of the construction of FIG. 1 after the printing of indicia thereon.
Figure 5:
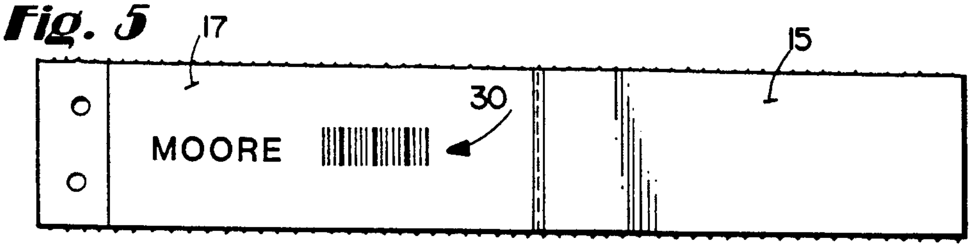
FIG. 5 is a view like that of FIG. 4 only showing the right tractor margin removed.
Figure 6:
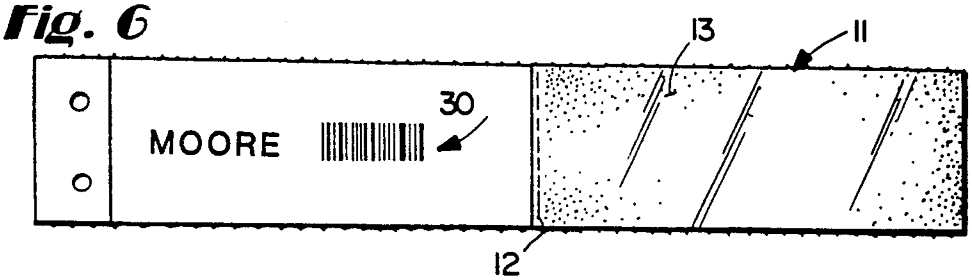
FIG. 6 is a view like that of FIG. 5 only showing the first release liner removed.

After printing, the individual label assemblies are burst from the rest of the construction 10, as illustrated in FIG. 4. Then the margin containing the tractor holes 22 is removed—as illustrated in FIG. 5—by separation along the perforation 24. After that, the first release liner 15 is removed to provide the construction illustrated in FIG. 6, comprising the first section of transparent protective material 11 having a first adhesive 13 thereon, and then the first section of transparent material 11 is folded over—about the perf line 12—to cover the indicia 30 on the label ply 17. The indicia 30—including bar code information—is still readable through the transparent protective material 11.

Figure 7:
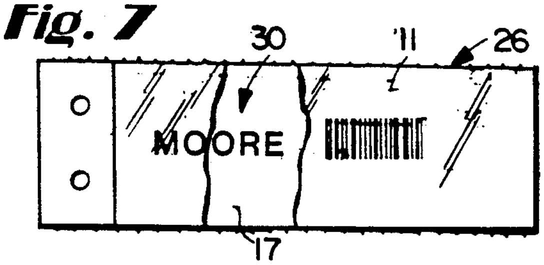
FIG. 7 is a view like that of FIG. 6 only showing the protective material folded over the label ply.
Figure 8:
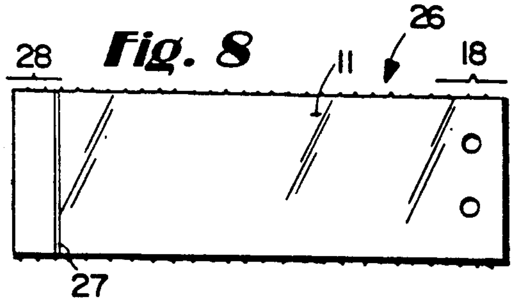
FIG. 8 is a bottom view of the product of FIG. 7.
Figure 9:
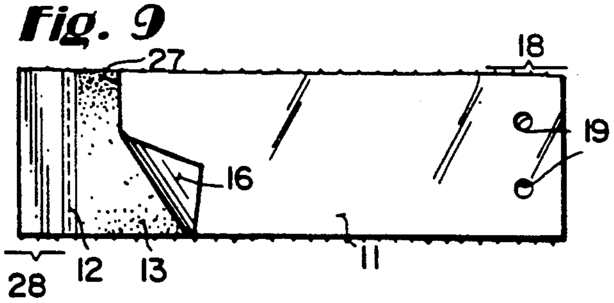
FIG. 9 is a view like that of FIG. 8 only showing the second release liner during removal thereof.
Figure 10:
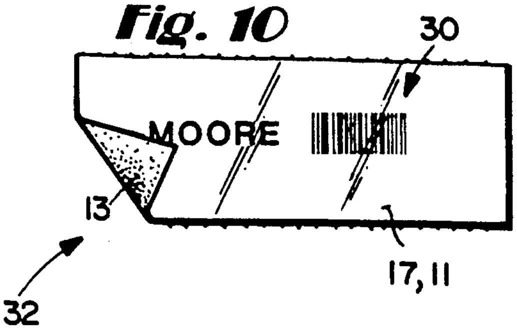
FIG. 10 is a showing of the final label being applied to a surface.

After the construction in FIG. 7 is formed, the assembly 26 is turned over to expose a second section of material 11 having a slit 27 therein. The tab 28 is folded back, and the large section to the right of the slit 27 having the second release liner 16 and the second section of transparent material 11 is peeled back, as schematically illustrated in FIG. 9, removing with it the section 18 containing the tractor openings 19. The tab section 28 is detached along the perforation 12, so that the first adhesive 13 on the back of the label ply 17 is exposed. The final label—as illustrated in FIG. 10—thus includes a label ply 17 with indicia 30 thereon, a transparent covering material 11, and adhesive 13 on the back thereof. The final label 32 can be applied to any surface, as illustrated schematically in FIG. 10.

It will thus be seen that according to the present invention a simple yet effective label construction, and method of forming a protected printed label, are provided. The final label 32 is utilizable in a wide variety of environments, including moisture, chemicals, dust, dirt, etc. The label will have maximum life since the bar code or like indicia 30 is protected by Mylar material, yet the label is easy to construct utilizing conventional demand printing equipment.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to cover all equivalent products and procedures.

What is claimed is:

1. A label construction, comprising:

a first ply of transparent protective material, having a first side section and a second side section, a first face, and a second face;

a first adhesive disposed on said first ply first face;

a first release liner, having less affinity for said first adhesive than said transparent protective material disposed on said first adhesive covering said first side section of said first ply;

a second release liner, disposed on said first adhesive covering said second side section of said first ply, said second release liner and said transparent protective material both having affinity for said first adhesive;

a label ply disposed over at least a portion of said second release liner on the opposite face thereof from said transparent protective material; and a second adhesive disposed between said second release liner and said label ply and having greater affinity for said label ply than said second release liner.

2. A construction as recited in claim 1 wherein said label construction is continuous form, and further comprising tractor holes formed in said first and second release liners.

3. A construction as recited in claim 2 further comprising a plurality of spaced parallel perforation sets formed in each of said transparent material ply, said label ply, and said release liners, to form a plurality of distinct label assemblies.

4. A construction as recited in claim 2 wherein said tractor openings in said first release liner are also provided in said transparent ply first section, and further comprising perforations formed in said first release liner and transparent ply first section to allow detachment of said tractor openings therefrom.

5. A construction as recited in claim 4 further comprising a perforation formed in said transparent protective material ply between said first and second sections thereof.

6. A construction as recited in claim 1 wherein said label construction is continuous form, and further comprising a plurality of spaced parallel perforation sets formed in each of said transparent material ply, said label ply, and said release liners, to form a plurality of distinct label assemblies.

7. A construction as recited in claim 6 further comprising means defining a slit in said transparent material ply in said second section thereof, adjacent said first section, said slit substantially perpendicular to said perforation sets.

8. A construction as recited in claim 1 wherein said second release liner has a first edge which is most remote from said transparent ply, said first edge spaced from edges of said label ply and transparent material ply and extending outwardly therefrom, to define a tractor portion distinct from said label ply and said transparent material ply.

9. A construction as recited in claim 1 further comprising a perforation formed in said transparent protective material ply between said first and second sections thereof.

10. A construction as recited in claim 1 wherein said transparent protective material comprises Mylar.

* * * * *